Jan. 4, 1966 P. CAILLOUX 3,227,094
HIGH PRESSURE HYDRAULIC PUMPS
Filed June 25, 1963 2 Sheets-Sheet 1

Inventor
Paul Cailloux
by Michael S. Striker

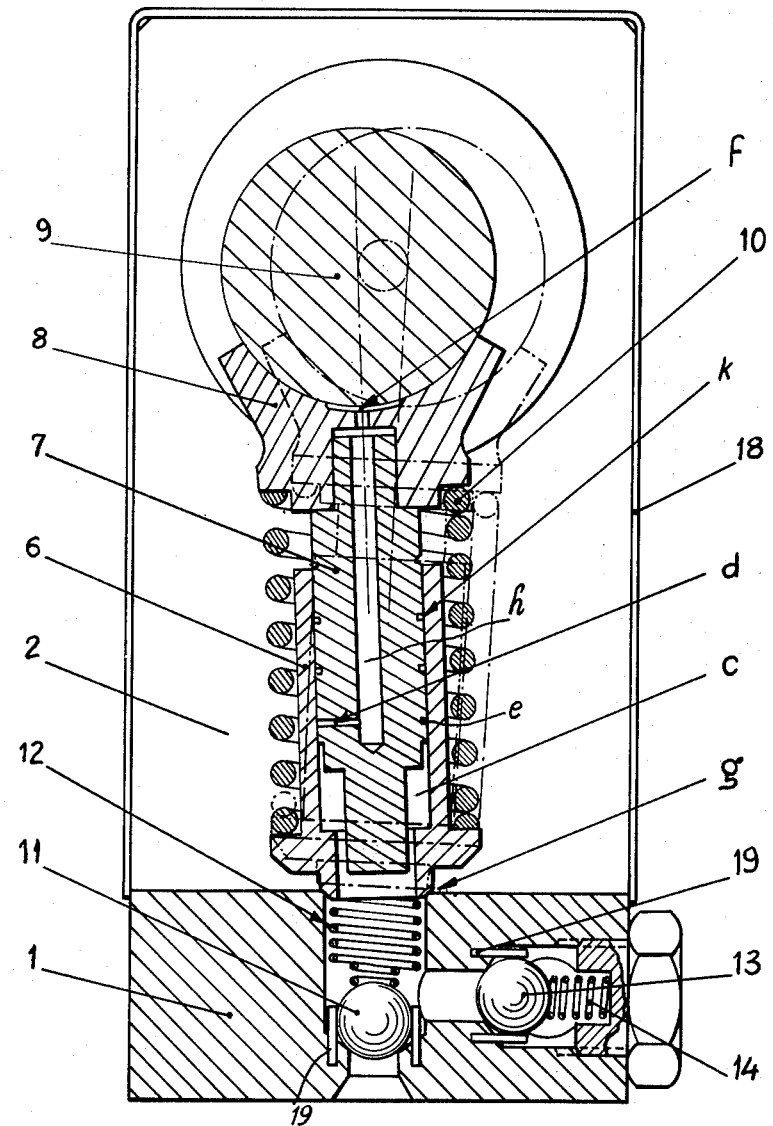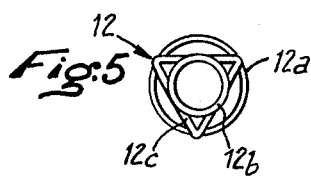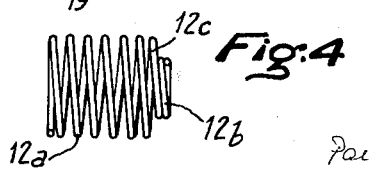

United States Patent Office 3,227,094
Patented Jan. 4, 1966

3,227,094
HIGH PRESSURE HYDRAULIC PUMPS
Paul Cailloux, Le Perreux, France, assignor to Etablissements Promecan (Les Procedes Mecaniques Modernes), Strasbourg, France, a company of France
Filed June 25, 1963, Ser. No. 290,536
Claims priority, application France, June 28, 1962, 902,303
8 Claims. (Cl. 103—159)

This invention relates to high pressure hydraulic pumps in which the rotational movement of a crankshaft driven by a motor is converted into a reciprocating movement of a piston in a cylinder, which bears against the frame of the pump by a joint of the ball and socket type.

In previous known pumps of this type, the ball and socket joint serves only to support the cylinder.

According to the present invention, the compression chamber of the pump is constituted by a first chamber formed by the cylinder and a second chamber contained in the frame of the pump, these two chambers communicating with one another through a passage passing through the spherically shaped support surface of the cylinder on the frame, while the section of the second chamber near the support surface is smaller than that of the cylinder, so that the tightness of the support surface is ensured.

These improvements have the object of simplifying manufacture, reducing the number of parts, facilitating assembly of the elements, and increasing the output of the pump.

Other features and advantages of the invention will be clear from the description below. It is however clearly understood that this description relates merely to one embodiment which is given by way of example and without limitation, and that the invention may be performed in various alternative ways based on the same principles.

In the accompanying drawings:

FIGURE 2 is a section on the line II—II on a larger scale than FIGURE 1.

FIGURES 4 and 5 show two views of a spring used in the pump illustrated.

Figure 1:
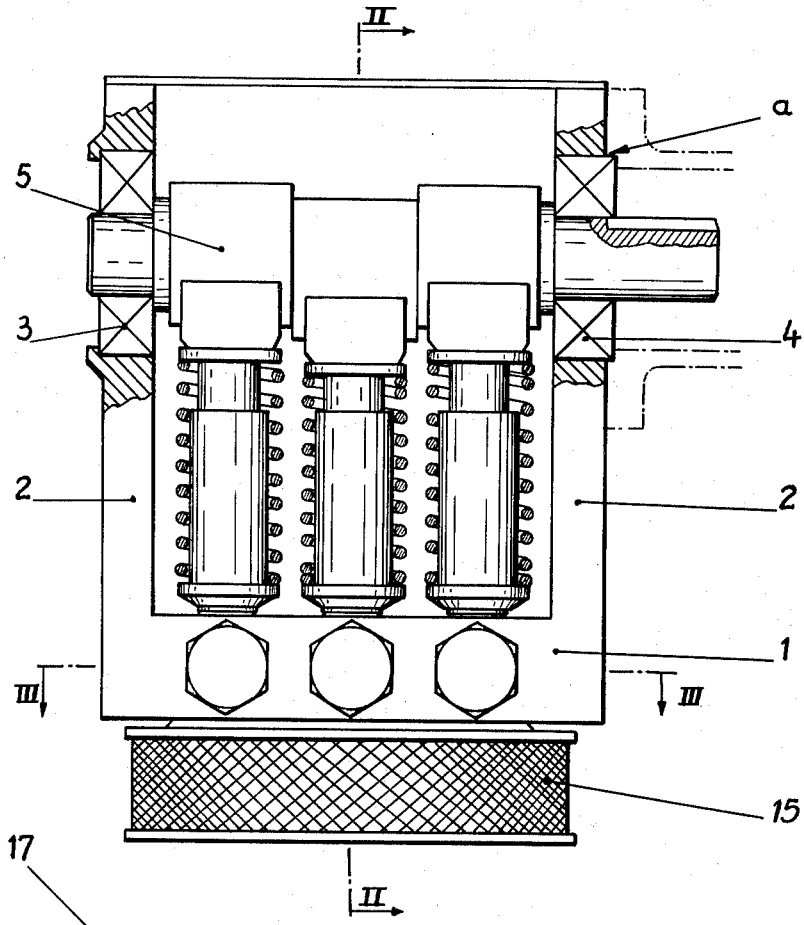
FIGURE 1 shows a general view of the pump in elevation and in partial section through the bearings.
Figure 3:
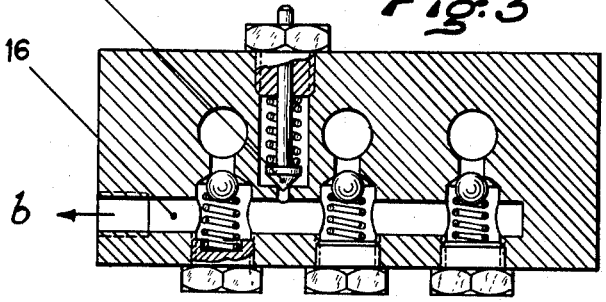
FIGURE 3 is a section on the line III—III in FIGURE 1.

In the present case, three elementary pumps disposed in line are mounted on the cylinder head 1.

As can be seen from FIGURE 2, each of these elementary pumps is constituted by a cylinder 6 and a piston 7. The latter is driven by a crankpin 9 on the crankshaft 5 through the medium of a bearing 8. The cylinder 6 rests on the cylinder head 1 through a spherical bearing surface $g$, as will be explained below. A spring 10 is interposed between the cylinder 6 and the bearing 8.

The compression chamber of each pump is formed on the one hand by the chamber $c$ of the cylinder 6 and on the other hand by a chamber 20. The latter is a cavity in the cylinder head 1, and is in communication with the chamber $c$ through the spherical bearing surface $g$, with the suction chamber under the control of a ball valve 11, and with the delivery chamber 16 under the control of a ball valve 13. Springs 12 and 14 urge the vavles 11 and 13 respectively into the closed position.

Suction is effected through a filter 15. The oil passes at $b$ out of the delivery chamber 16, which has a safety valve 17.

The whole arrangement is covered by a casing 18.

The piston 7 forms in the interior a chamber $h$ which is in communication with the compression chamber $c$ through holes $d$ leading into a circular groove $e$. Other grooves $k$ provide relative sealing of the piston 7 in the cylinder 6.

At the moment of compression, part of the oil contained in the chamber $c$ passes between the cylinder 6 and the piston 7, is collected in the groove $e$, passes through the holes $d$ into the chamber $h$, and penetrates under a certain pressure into a recess $f$ provided between the bearing 8 and the crankpin 9. The oil in this recess $f$ forms a cushion of liquid between these two parts 8 and 9, and infiltrates between the remainder of the face of the bearing 8 and the crankpin 9; frictional forces between the crankpin 9 and the bearing 8 are consequently considerably reduced, the reduction being the greater the higher the oil pressure. The output of the pump is thus very markedly improved and the life of the bearing 8 and crankpin 9 is considerably lengthened, particularly as the oil which penetrates between the two parts 8 and 9 is filtered by passing through the very small clearance existing between the piston 7 and the cylinder 6.

The cylinder 6 is supported at $g$ on the cylinder head 1 by a spherical bearing surface which is of slight width and perfectly polished. During the suction, the spring 10 which bears on the bearing 8 ensures contact on the one hand between the crankpin 9 and the bearing 8, and on the other hand between the bearing surface $g$ of the cylinder 6 and the cylinder head 1. The diameter of the compression chamber $c$ is selected to be larger than the diameter of the bearing surface $g$ of the cylinder 6. The ratio of the sections is selected between 0.7 and 0.9. At the moment of compression this results in a hydraulic reaction of between 0.3 and 0.1 of the compressive stress. This reaction is absorbed by the spherical bearing surface $g$ and ensures its tightness.

The arrangement thus made permits conversion of the uniform circular movement of the crankshaft 9 into a reciprocating rectilinear movement of the piston 7, without using a connecting rod. In addition to the elimination of the connecting rod, this leads to the elimination of the gudgeon pin and its bearing, and also to a simplification of assembly. The support reaction of the connecting rod on the piston, and consequently the ovalisation of the cylinder 8, are also eliminated. Another advantage of the resulting arrangement is the possibility of limiting the bearing to its operative part, that is to say to 0.25-0.40 of its circumference. In addition, the spring 10 by cancelling any clearance which may exist between the bearing 8 and the crankpin 9 permits silent operation throughout the life of the pump.

The spring 12 holds the ball type suction valve 11 on its seat. As can be seen in FIGURES 4 and 5, this spring 12 is constituted by turns 12$a$ of relatively large diameter, turns 12$b$ of smaller diameter, and an intermediate turn 12$c$ of triangular shape, the sides of which serve to support the turns 12$b$ and the apices to support the turns 12$a$.

The number of these turns is such that when the spring is compressed, the turns 12$a$ and 12$b$ are contiguous. The movement of the ball 11 is thus limited, without hindering the passage of the oil. The suction valve 11 is guided by three pins 19 during its displacements. These pins 19 leave a maximum passage between them for the circulation of the liquid, and afford the advantage of very great simplicity of machining. Three identical pins 19 are used for the delivery valve 13.

It should be observed that this guidance and this type of spring may be applied to obturators used in other hydraulic apparatus than the pump illustrated.

I claim:

1. A high pressure hydraulic pump comprising, in combination, a stationary cylinder head forming a chamber having an open end and a spherical seat about said open end; a cylinder having a closed end and an opposite open end and being formed at said closed end with a passage therethrough communicating with said chamber and having at said closed end about said passage a complementary spherical seat engaging said spherical seat of said cylinder head so that said cylinder is universally tiltable with respect to said cylinder head; a piston extending with one end thereof into said cylinder and being substantially fluid-tightly guided therein; rotatable eccentric means operatively connected to the other end of said piston for reciprocating said piston relative to said cylinder and for tilting thereby said piston and said cylinder through a limited angle of such a size that said passage will always remain in full communication with said open end of said chamber; an outlet passage communicating with said chamber; an inlet passage communicating with said chamber; one-way valve means in said outlet passage permitting flow of fluid from said chamber through said outlet passage while preventing flow of fluid in the opposite direction; and one-way valve means in said inlet passage permitting flow of fluid through said passage into said chamber while preventing flow of fluid in the opposite direction.

2. A high pressure hydraulic pump comprising, in combination, a stationary cylinder head forming a chamber having an open end and a spherical seat about said open end; a cylinder having a closed end and an opposite open end and being formed at said closed end with a passage therethrough communicating with said chamber and having at said closed end about said passage a complementary spherical seat engaging said spherical seat of said cylinder head so that said cylinder is universally tiltable with respect to said cylinder head; rotatable eccentric means arranged opposite and spaced from said open end of said cylinder; a piston having one end portion extending through said open end of said cylinder into said cylinder and being fluidtightly guided therein, said piston having an opposite end portion engaging said eccentric means only at the side thereof facing said open end of said cylinder, said piston being reciprocated relative to said cylinder during rotation of said eccentric means and said piston and said cylinder being tilted thereby through a limited angle of such a size that said passage will always remain in full communication with said open end of said chamber; an outlet passage communicating with said chamber; an inlet passage communicating with said chamber; one-way valve means in said outlet passage permitting flow of fluid from said chamber through said outlet passage while preventing flow of fluid in the opposite direction; and one-way valve means in said inlet passage permitting flow of fluid through said passage into said chamber while preventing flow of fluid in the opposite direction.

3. A high pressure hydraulic pump comprising, in combination, a stationary cylinder head forming a chamber having an open end and a spherical seat about said open end; a cylinder having a closed end and an opposite open end and being formed at said closed end with a passage therethrough communicating with said chamber and having at said closed end about said passage a complementary spherical seat engaging said spherical seat of said cylinder head so that said cylinder is universally tiltable with respect to said cylinder head; rotatable eccentric means arranged opposite and spaced from said open end of said cylinder; a piston having one end portion extending through said open end of said cylinder into said cylinder and being fluidtightly guided therein, said piston having an opposite end portion engaging said eccentric means only at the side thereof facing said open end of said cylinder, said piston being reciprocated relative to said cylinder during rotation of said eccentric means and said piston and said cylinder being tilted thereby through a limited angle of such a size that said passage will always remain in full communication with said open end of said chamber; compression spring means engaging with opposite ends thereof said opposite end portion of said piston and said cylinder for maintaining said opposite end portion of said piston in engagement with said eccentric means and for pressing said complementary spherical seat of said cylinder against said spherical seat of said cylinder head; an outlet passage communicating with said chamber; and inlet passage communicating with said chamber; one-way valve means in said outlet passage permitting flow of fluid from said chamber through said outlet passage while preventing flow of fluid in the opposite direction; and one-way valve means in said inlet passage permitting flow of fluid through said passage into said chamber while preventing flow of fluid in the opposite direction.

4. A high pressure hydraulic pump as set forth in claim 3, wherein said eccentric means is constituted by a crankshaft having a crank pin and wherein said opposite end of said piston has a cylindrical surface engaging said crank pin only over a fraction of its circumference and only at the side thereof facing said open end of said cylinder.

5. A high pressure hydraulic pump as set forth in claim 4, wherein said opposite end of said piston is formed with a cavity extending from said cylindrical surface of said piston at said opposite end into said piston, wherein said piston is formed at the outer surface thereof adjacent the end facing said closed end of said cylinder with an annular groove, and including passage means connecting said annular groove with said cavity so that fluid in said cylinder will pass during reciprocation of said piston into said cavity reducing thereby friction between said crank pin and said cylindrical surface at the opposite end portion of said piston.

6. A high pressure hydraulic pump as set forth in claim 1, wherein each of said one-way valves is constituted by a ball valve including a valve seat formed in the respective passage, a ball member movable toward and away from said valve seat, spring means operatively engaging said ball member and biased to resiliently maintain said ball member on the respective valve seat, and three fixed pins tangent to the ball member and parallel to the axis of the valve seat.

7. A high pressure hydraulic pump as set forth in claim 6, wherein said spring means is constituted by a coil spring having a plurality of turns of small diameter adjacent to the respective ball member, a series of turns of larger diameter, and an intermediate turn connecting a turn of small diameter to a turn of large diameter, said intermediate turn serving as the support for the turns which it connects.

8. A high pressure hydraulic pump as set forth in claim 7, wherein said intermediate turn has the shape of an equilateral triangle, the sides of which serve to support the turns of small diameter and the apices of which serve to support the turns of large diameter.

References Cited by the Examiner

UNITED STATES PATENTS 1,701,003   2/1929   Harr et al. _____ 230—175

FOREIGN PATENTS 63,095   7/1955   France.
(1st Add. of French Patent 1,040,183)

LAURENCE V. EFNER, *Primary Examiner.*

WARREN E. COLEMAN, *Examiner.*